Feb. 25, 1930. W. P. REED ET AL 1,748,585
CAR WHEEL TRUING APPARATUS
Filed Aug. 18, 1927 2 Sheets-Sheet 1

Inventors
W. P. Reed
R. C. May
By
Attorney

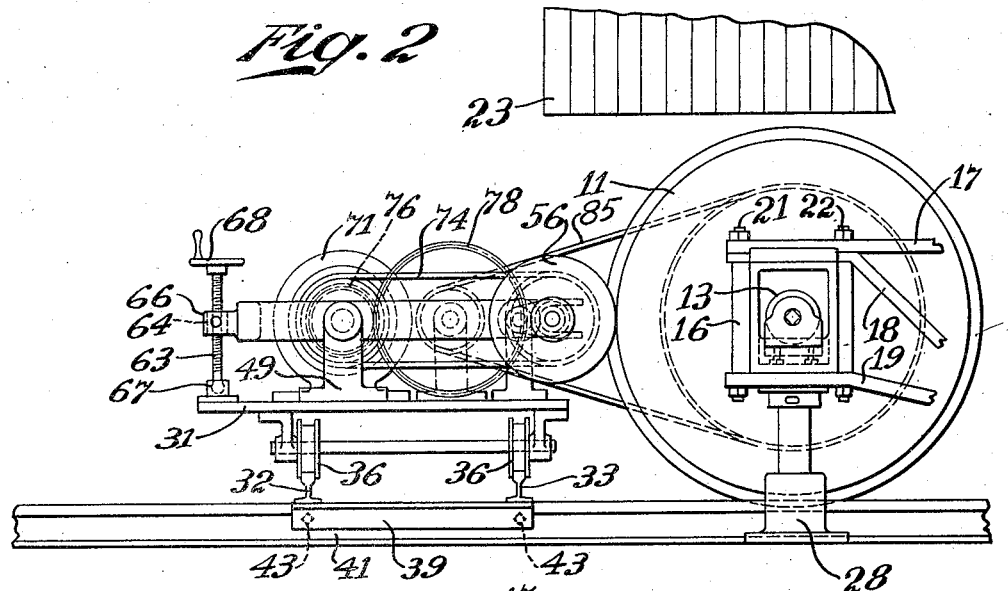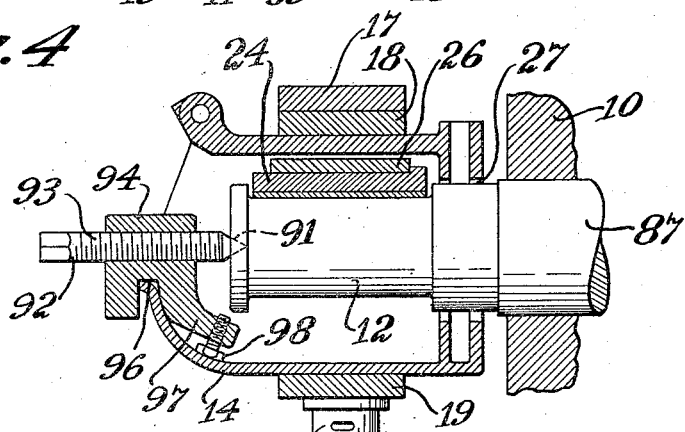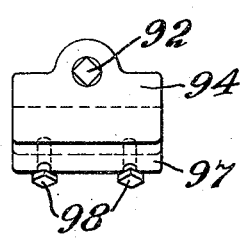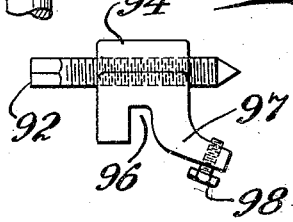

Patented Feb. 25, 1930

1,748,585

UNITED STATES PATENT OFFICE

WILLIAM P. REED AND ROBERT C. MAY, OF BIRMINGHAM, ALABAMA

CAR-WHEEL-TRUING APPARATUS

Application filed August 18, 1927. Serial No. 213,947.

Our invention relates to apparatus for truing up railway car wheels without removing them from the car and has for its object the provision of such apparatus which shall be simple of design and of operation and which shall be capable of quickly truing up wheels in place while, at the same time, maintaining the wheel treads concentric with the axis.

A further object of our invention is to provide, in car wheel truing apparatus, a simple effective device for centering the wheels when being trued, without the necessity of removing the wheels from the car.

A still further object of our invention is to provide apparatus of the character designated which shall be light and portable, readily moved from place to place and capable of being easily and quickly set up under a railway car in position to true the wheels thereof.

As is well known in the art to which our invention relates, the wheels of a car are often slid when the brakes are set, resulting in flat spots being formed on the wheels. The flat spots thus formed strike the rails at every revolution of the wheels, the blow thereof sometimes causing the wheels to break and wreck the car. For this reason strict inspection rules have been established, whereby the car wheels are given a rigid inspection at regular intervals and wheels having flat spots above a minimum designated size are condemned and the car taken out of service. Heretofore it has been the practice to remove the damaged wheels from under a car and replace them with a new pair, while the pair removed were sent, along with others, to a shop to be repaired or else scrapped.

This procedure is very expensive because a great amount of labor is involved in dismantling a car truck in order to remove a pair of wheels and to replace them. Furthermore, the time involved is such as to often seriously delay rush shipments of perishable goods, thereby involving a still greater expense.

While apparatus has heretofore been proposed for truing up car wheels in place under a car, difficulties have been encountered in the practical operation thereof, due to the fact that no satisfactory means have been provided whereby the wheels were firmly held centered when being rotated and machined, so that any given point on the periphery thereof would describe a true circle. The result of this has been that when the work was completed, the surface of the wheel tread would not be concentric with respect to the journal and the job would be unsatisfactory.

These and other objections are overcome with apparatus made in accordance with our invention and a light, portable truing up apparatus provided, yet being sufficiently sturdy to fully accomplish its purpose.

Briefly, our invention comprises a motor driven truing up machine together with means for readily and firmly engaging it with the rails of the track adjacent the wheels to be trued. The wheels to be trued are centered by means of a device adapted to coact with the car wheel journal box and the center mark of the journal when the wheels are jacked up under the car. When in this situation, the weight of the car acts through the truck frame and the jack to firmly hold the box in position while the centering devices only have to support the weight of the wheels. The wheels are then slowly rotated in proximity to a suitable tool, preferably a grinding wheel rotated at a relatively high speed, until the flat spots are fully removed. The apparatus also includes novel means for traversing the grinding wheel across the wheel tread in operation and for adjusting the apparatus to the depth of cut required.

Apparatus embodying features of our invention is illustrated in the accompanying drawings, forming a part of this application, wherein Fig. 1 is a plan view of the apparatus in position for grinding a pair of railway car wheels;

Fig. 2 is a side elevation of the apparatus shown in Fig. 1;

Fig. 4 is a longitudinal sectional view through the journal box of a railway car showing our improved device for centering the wheels and holding them in position for truing up when raised clear of the track; and Figs. 5 and 6 are an end and side elevation, respectively, of the centering device removed from the journal box.

Figure 1:
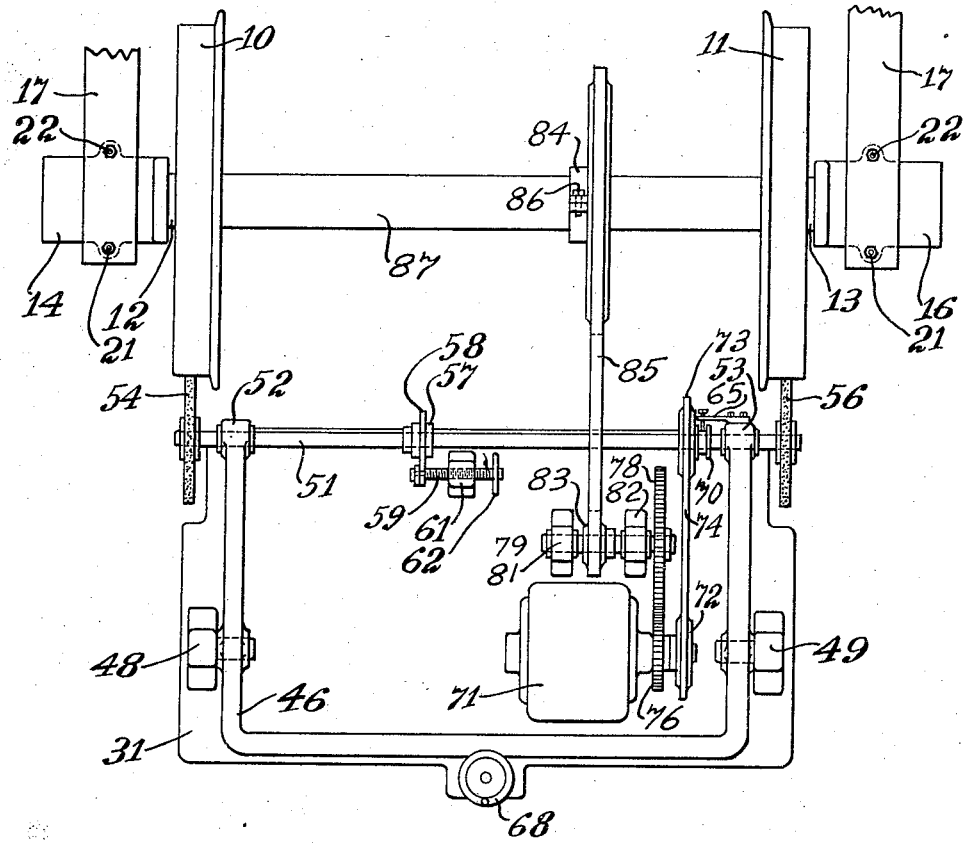

Referring now to the drawings for a better understanding of our invention, we show a pair of car wheels 10 and 11, the car wheels having journals 12 and 13, the journals being provided with the usual journal boxes 14 and 16. As is well understood the journal boxes are firmly held in place by the truck frame, a typical illustration of which is shown in Fig. 2. The truck frame may comprise an upper bar 17, a lower bar 18 and a pedestal tie bar 19, all of said bars being secured to said journal boxes by pedestal bolts 21 and 22. For brevity of description, the entire car truck is not shown, because its construction forms no part of our invention and may differ very widely in design according to the service for which it is intended. It is understood and well known, that the weight of the car, a fragment of which is shown at 23 in Fig. 2, is transmitted to the journal through the truck frame, the journal box and suitable bearings such as brasses, shown at 24 in Fig. 4, and brass retaining members or wedges such as 26. The end of the journal box, where the journal enters, is provided with an opening 27, somewhat longer than the journal so as to permit wear of the bearing 24 without engagement of the journal with the journal box, and also to permit the ready application and removal of the box from the journal. Whenever it is desired to remove a bearing from a journal box, a jack, such as 28, is placed beneath the journal box or the pedestal tie bar 19 and the box is raised so as to free the bearing.

Our improved machine for truing up car wheels such as have just been described, comprises a base member 31 having a frame embodying cross rails 32 and 33 adapted to lie across the parallel rails of the railway track. The base 31 may be supported in any suitable manner from the rails 32 and 33. For convenience in handling, we show the base 31 as mounted on flanged pairs of wheels 34 and 36. With this arrangement the rails 32 and 33 may first be laid across the track and the machine properly placed upon the rails 32 and 33 and rolled to position. When in position, the wheels may be held from further movement by suitable stops 37 and 38. It is to be understood however that we are not limited to this arrangement and only show it for convenience.

Figure 3:
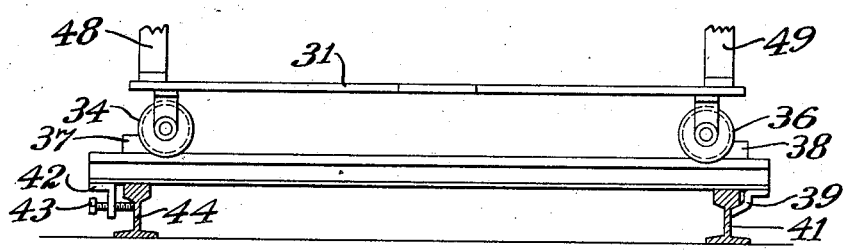
Fig. 3 is a detail view in elevation showing the method of securing the apparatus to the railway track.

The rails 32 and 33 should be firmly secured to the railway track, in order to prevent shifting of the apparatus in operation. A convenient method of accomplishing this purpose is illustrated in Figs. 2 and 3, wherein a Z bar 39 extends transversely of the rails 32 and 33 and is welded thereto at one end thereof so that the lower flange of the bar hooks over the head of one of the railway rails and engages the web 41 thereof. At the other end of the rails 32 and 33 a flange member 42 is welded to the ends of the rails 32 and 33 and is provided with suitable tightening screws 43 adapted to bear against the web 44 of the opposed railway rail. In this manner the frame of the machine may be rigidly secured to the railway track.

Mounted on the base member 31 is a frame 46, said frame being pivoted to suitable pedestals 48 and 49, the latter being supported from the base 31. Carried by the pivoted frame 46 is a shaft 51 journaled in bearings 52 and 53 and adapted to have mounted thereon a pair of grinding wheels 54 and 56.

The shaft 56 has provided thereon a collar 57 having a fork 58 fitting thereover, the fork 58 being pivoted on a screw 59, the latter cooperating with a pedestal 61 also mounted on the base 31. A handle 62 is provided on the screw 59 whereby the fork 58 may be moved transversely of the frame and of the wheels 54 and 56 causing them to traverse the treads of the wheels 10 and 11.

Mounted on the base member 31 and pivoted thereto on the side opposite the shaft 51 is a screw 63, cooperating with a pivot nut 64 carried in a strap 66, the latter being secured to the pivoted frame 46. The pivotal connection of the screw 63 with the base 31 is formed with a swivel connection 67. A handle 68 is provided on the screw 63 whereby it may be turned to the right or left and thereby lower or raise the shaft 51 and vary the position of the grinding wheels 54 and 56 with respect to the tread of the car wheels 10 and 11.

Mounted on the base 31 is a motor 71 having its axis of rotation coincident with the pivots 48 and 49. The motor 71 has directly connected thereto a sprocket 72. Mounted on the shaft 51 is a sprocket 73, connected to the sprocket 72 by a chain 74. In this manner, the shaft 51 is rotated at the same speed as the motor 71 and in the same direction. The sprocket 73 is splined to the shaft 51 and is provided with a collar 70. The collar 70 is held from longitudinal movement by a member 65 secured to the pivoted frame 46.

Directly connected to the motor 74 is a relatively small gear 76 meshing with a larger gear 78, the latter being mounted on a shaft 79 journaled in suitable bearings 81 and 82

Mounted on the shaft 79 is a relatively small sprocket wheel 83. It will be observed that with the gear train shown, the shaft 79 and sprocket 83 are caused to rotate in a direction opposite to that of the motor and at a lower speed.

In order to transmit motion from the sprocket 83 to the wheels 10 and 11, when they are raised clear of the rails and supported and centered in a manner to be described more particularly hereinafter, we provide a divided sprocket 84 adapted to be clamped, as by means of bolts 86 to the car wheel axle 87, and connected to the sprocket 83 by a sprocket chain 85. The sprocket 84 is made much larger in diameter than the sprocket 83 whereby the speed of rotation of the wheels 10 and 11 is less than that of the sprocket 83, the object being to impart a much slower rotative movement to the wheels 10 and 11 than the speed of the motor 71 and in a direction opposed to the direction of rotation of the grinding wheels 54 and 56.

With the apparatus so far described it will be observed that we have provided means for turning car wheels when raised clear of the rails and for grinding the wheels while being turned. It will be obvious however to those skilled in the art that if no means are provided for holding the wheels firmly centered during rotation, that a given point on the periphery thereof would not describe a true circle and, when the grinding operation was completed the tread of the wheels would not be truly concentric with respect to the journal. We have accordingly provided a simple effective means for accomplishing this important purpose. As is well understood, all car wheel journals are provided, when made, with centering holes in the ends thereof such as is shown at 91 in Fig. 5, the purpose of these centering holes being to mount the journals and wheels in a lathe or other such apparatus when being turned up for service. We utilize these centering holes to coact with a centering screw 92, this latter member being provided with threads 93 coacting with similar threads formed in the body portion of a supporting member 94. The body portion of the supporting member 94 is provided with a slot 96 adapted to hook over the edge of a journal box. A lower depending portion 97 of the supporting member is adapted to be entered in the journal box beneath the end of the journal and bear against the bottom of the journal box in order to support the wheel. In order to accommodate the centering device to journal boxes of various depths a pair of adjusting screws 98 are provided in the depending portion 97 whereby the body portion 94 and centering screws 92 can be set at such an angle as to cause the centering screw to be coaxial, when raised with its cooperating journal.

When a pair of wheels are to be ground in place, the machine is placed adjacent to the wheels, the centering devices are hooked over the edge of the open end of the journal box with the centering screws 92 retracted. The centering device is then properly adjusted so as to bring the axis of the screw 92 parallel with the axis of the journal by means of the screws 98. A jack is then placed under each journal box, only one jack being shown, and the journal box is raised. At the proper time the centering screws 92 are screwed into the centering holes 91, and as the raising of the journal box continues, the wheels are raised by the coaction of the centering device with the journal box and the journal until they are clear of the railway track. In this situation the journal is clear of the journal box around the edges of the hole 27. The wheels are now firmly held centered and suspended above the rails, free to rotate. The divided sprocket 84 is now put in place on the axle 87 and connected by the sprocket chain 85 to the sprocket 83. The frame of the apparatus is secured to the railway tracks by means of the screws 43 and the apparatus is ready to be operated. The motor 71 is then started and the position of the grinding wheels 54 and 56 adjusted by means of the screws 59 and 63.

From the foregoing it will be apparent that we have devised an improved machine for grinding railway car wheels in place which is simple in construction and operation and which will quickly true up a pair of car wheels and make the treads thereof concentric with the axles.

While we have shown our apparatus as carrying out its operations wholly by grinding the wheels, it is not to be construed that we are limited to such an arrangement but that our invention may be practiced with any well known tools for truing up the cylindrical surfaces of the car wheel treads.

While we have shown our invention in but one form, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

What we claim is:—

1. In apparatus for truing railway car wheels in place, said car wheels having journal boxes and journals with centering holes in the ends thereof, a device fitting the edge of the journal box, and means carried by the device and adapted to fit into the centering hole of the journal when the journal box is raised and to support the journal clear of the box when so fitted.

2. In apparatus for truing railway car wheels in place, said car wheels having journals with centering holes in the ends thereof, a device fitting the edge of the box and provided with means bearing against the bottom of the box when in position, and means carried by the device and adapted to fit into the centering hole of the journal when the journal box is raised and to support the wheel when so fitted.

3. In apparatus for truing railway car wheels in place, said car wheels having journals with centering holes in the ends thereof, a device fitting the edge of the box and provided with means bearing against the bottom of the box when in position, and means carried by the device and adapted to fit into the centering hole of the journal when the journal box is raised and to support the wheel with the box when so fitted, and means for varying the angle of said last mentioned means with respect to the bottom of the journal box.

4. In apparatus for truing up railway car wheels in place on a railway track, said car wheels having an axle, journals and journal boxes, means for raising the car wheels clear of the tracks, means for imparting rotary motion to the car wheels, and a centering device coacting with the journal box and the journal for firmly holding the car wheel centered and clear of the rail while rotating.

5. In apparatus for truing up railway car wheels in place, each of said car wheels having a journal with a centering hole and a journal box in which the journal turns, a centering device comprising a body portion adapted to hook over the edge of a journal box door, a portion adapted to extend into the journal box and coact with the bottom of said journal box, and a centering pin carried by the body portion and adapted to coact with the centering hole of the journal and hold it centered when the journal box is raised.

6. In apparatus for truing up railway car wheels in place, each of said car wheels having a journal with a centering hole and a journal box in which the journal turns, a centering device comprising a body portion adapted to hook over the edge of a journal box door, a relatively wide portion adapted to extend into the journal box, adjustable means carried by the relatively wide portion and adapted to rest on the bottom of the journal box to vary the angle of the body portion with respect to the journal box, and a centering screw carried by the body portion and adapted to be entered into the centering hole of the journal and coact with said journal to hold the wheels centered when the journal box is raised.

7. In apparatus for truing up car wheels in place on a railway track, said car wheels having a frame, axle, journals and journal boxes, means for raising the journal boxes and frame, means coacting between the journal boxes and the journals for holding them centered clear of said journal boxes, a pivoted frame, a shaft carried by the pivoted frame, power means having its operating axis coincident with the pivot axis of the frame, a grinding wheel carried by the shaft, power transmission means associated with the power means for rotating the car wheel and the shaft in opposed directions and means for varying the angle of the pivoted frame.

In testimony whereof we affix our signatures.

WILLIAM P. REED.
ROBERT C. MAY.